United States Patent Office 3,546,227
Patented Dec. 8, 1970

---

3,546,227
2,3-DIHYDRO-1H-BENZ[d,e]ISOQUINOLINE CARBOXAMIDINES
John Gmünder, Muttenz, and Richard Berthold, Reinach, Basel-Land, Switzerland, assignors to Sandoz Ltd. (also known as Sandoz AG), Basel, Switzerland
No Drawing. Filed Nov. 24, 1967, Ser. No. 685,321
Claims priority, application Switzerland, Dec. 1, 1966, 17,194/66; May 29, 1967, 7,546/67
Int. Cl. C07d 39/00
U.S. Cl. 260—288      8 Claims

---

ABSTRACT OF THE DISCLOSURE

The present invention provides compounds of the formula:

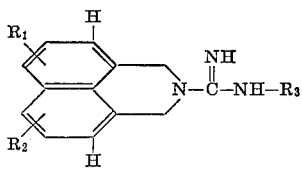

wherein either $R_1$ is hydrogen and $R_2$ is halogen, hydroxy, lower alkoxy of 1 to 4 carbon atoms, or amino, or $R_1$ and $R_2$ are the same and each is hydrogen, halogen, hydroxy, lower alkoxy of 1 to 4 carbon atoms, or amino, and $R_3$ is hydrogen, or lower alkyl of 1 to 4 carbon atoms, and the pharmaceutically acceptable acid addition salts thereof.

The compounds are useful in the treatment of hypertonia and heart and other circulatory illnesses.

The production of these compounds is furthermore described.

---

The present invention relates to new heterocyclic compounds and a process for their production.

The present invention provides heterocyclic guanidine derivatives of Formula I,

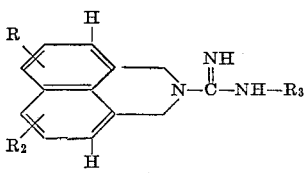

in which either $R_1$ signifies hydrogen and
$R_2$ signifies halogen, hydroxy, lower alkoxy of 1-4 carbon atoms or amino,
or
$R_1$ and $R_2$ have the same significance and each signifies hydrogen, halogen, hydroxy, lower alkoxy of 1-4 carbon atoms, or amino, and
$R_3$ signifies hydrogen or lower alkyl of 1-4 carbon atoms, and acid addition salts thereof.

The present invention further provides processes for the production of compounds of Formula I and their acid addition salts, characterized in that (a) an amine of Formula II,

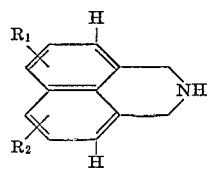

in which $R_1$ and $R_2$ have the above significance, is reacted in the presence of one equivalent of a mineral acid with a compound of Formula III,

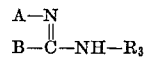

in which $R_3$ has the above significance, and
either

A signifies hydrogen and
B signifies a 1-pyrazolyl radical, a 1-pyrazolyl radical mono- or disubstituted by lower alkyl or aryl in the 3- and/or 5-position, or a lower alkoxy or alkylthio radical,
or
A and B together signify a third bond between the carbon and the nitrogen atom,
or (b) compounds of Formula Ia,

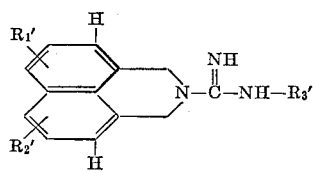

in which either $R_1'$ signifies hydrogen and
$R_2'$ signifies halogen or lower alkoxy of 1-4 carbon atoms,
or
$R_1'$ and $R_2'$ have the same significance and each signifies hydrogen, halogen, or lower alkoxy,
and
$R_3'$ signifies lower alkyl of 1-4 carbon atoms, are produced by reacting a mineral acid salt of a compound of Formula IV,

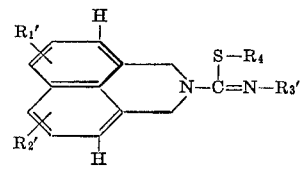

in which $R_1'$, $R_2'$ and $R_3'$ have the above significance, and
$R_4$ signifies lower alkyl, with amonia;

and in order to obtain the free base, this is liberated from the resulting salt with an alkali.

These bases are optionally converted into the corresponding salts by reacting with inorganic or organic acids, and/or the anion in the resulting salts is optionally exchanged by a double reaction.

Particular methods of effecting the processes of the invention are described below.

2,3-dihydro-1H-benz[d,e,]isoquinoline, its 5-methoxy-, 5-hydroxy-, 5-amino-, 6-bromo- or its 5,8-dimethoxy derivative may, for example, be used as starting material of Formula II.

The chemical reaction of the precess of the invention consists in that the secondary nitrogen atom of the starting material II is substituted by a carboxamidine radical which is already formed in the reaction component of Formula III; suitable compounds of Formula III are 1-pyrazol-carboxamidine or its derivatives substituted in the 3- and/or 5-position by lower alkyl or aryl, and/or in the carboxamidine radical by lower alkyl, O-alkyl-iso-ureas or S-alkyl-iso-thio-ureas which may have a lower alkyl radical on one of their nitrogen atoms, as well as cyanamides or alkyl-cyanamides. The process may, for example, be effected as follows, depending on the nature of the reaction component III:

In accordance with one embodiment of the process the amino component of Formula II is reacted with a mineral acid salt of a 1-pyrazol-carboxamidine which may have a lower alkyl radical on the carboxamidine radical, and which may optionally be mono- or disubstituted in the 3- and/or 5-position by lower alkyl or aryl, e.g. 1-pyrazol-carboxamidine hydrochloride. The reaction is effected in a suitable solvent, e.g. methylene chloride, chloroform, lower alkanols and acetonitrile, at an elevated temperature, preferably at the boiling temperature of the solvent, and has a duration of about 1 to 5 hours. In most cases the resulting compound of Formula I precipitates in the form of an acid addition salt upon cooling the reaction mixture; when no crystallization occurs, the solvent may be evaporated until crystallization commences, or to dryness, or ether may be added to the reaction solution until crystallization commences. For example, 2,3-dihydro-1H-benz[d,e]isoquinoline is maintained the boil for 1 to 5 hours with 1-pyrazol-carboxamidine hydrochloride in chloroform, and after cooling the reaction mixture the crystallized 2,3-dihydro-1H-benz[d,e]isoquinoline-2-carboxamidine hydrochloride is filtered off. In accordance with another method of the process an equimolar sodium butylate solution is added, for example, to 2,3-dihydro-5-methoxy-1H-benz[d,e]isoquinoline hydrochloride, the resulting solution of the free base is mixed with a solution of 1-pyrazol-carboxamidine hydrochloride in methanol, and the reaction mixture is maintained at the boil for 1 to 5 hours; ether is added to the cooled reaction mixture until crystallization commences, whereby 2,3-dihydro-5-methoxy - 1H-benz[d,e]isoquinoline-2-carboxamidine hydrochloride precipitates.

In accordance with a further embodiment of the process an inorganic salt, preferably the chloride, bromide, iodide or sulphate, of an O-alkyl-iso-urea or an S-alkyl-iso-thio-urea which may be substituted on one of its nitrogen atoms by a lower alkyl radical, e.g. S-methyl-iso-thio-urea sulphate, is added to the amino component II in a polar solvent, e.g. water or mixtures of water and lower alkanols. The mixture is allowed to stand at room temperature for 1 to 3 days and/or is maintained at the boil for some time, e. g. 1 to 5 hours, whereby an alkanol or an alkyl-mercaptan is formed during the reaction. The reaction mixture is subsequently evaporated to dryness, whereby the compound I results in the form of an inorganic acid addition salt.

Finally, the compounds of Formula II may also be heated with cyanamide or with an alkyl-cyanamide in the presence of one equivalent of a mineral acid, whereby a compound of Formula I is obtained in the form of an acid addition salt. In accordance with one method of the process an acid addition salt, e.g. the hydrochloride or the hydrobromide, of the amino component II is mixed with the cyanamide, and the mixture is maintained at 150–250° C. for about 15 minutes to one hour. A melted material generally results which crystallizes or solidifies to a glassy mass upon cooling or already during heating. In accordance with another method of the process, the reaction is effected in a suitable solvent, e.g. pyridine or a lower alkanol, in which case the amino component II is used in the form of an acid addition salt, e.g. the hydrochloride, or a mineral acid, e.g. sulphuric acid, is added to the reaction mixture. The mixture is heated to the boil under reflux for 5 to 24 hours and is subsequently allowed to cool, whereby the compound I usually precipitates in the form of an acid addition salt; when no crystallization occurs, the solvent is evaporated until crystallization commences, or to dryness. Compounds of Formula Ia may additionally be obtained by reacting a mineral acid salt, e.g. the hydrochloride, hydrobromide, hydriodide or sulphate, of a compound of Formula IV with ammonia at room temperature or at an elevated temperature. The raction may be effected without solvent or in a lower alkanol, at normal pressure or at an elevated pressure, and has a duration of 1 to 5 hours, depending on the reaction conditions. For example, an excess of liquid ammonia is added to 2,3-dihydro-2-(α-methylimino-α-methylthio)methyl - 1H-benz[d,e]isoquinoline hydriodide, the mixture is heated in a pressure vessel to 80–120° C. for about 4 hours, and after cooling, the excess ammonia and the resulting methylmercaptan are evaporated, whereby 2,3 - dihydro - N - methyl-1H-benz[d,e]isoquinoline-2-carboxamidine hydroiodide is obtained as residue.

The crude acid addition salts of the guanidine compounds I obtained in accordance with the embodiments of the process described above, may subsequently be purified in manner known per se, preferably by crystallization. When treatment with an alkali is included in the process, purification is preferably carried out with an anion exchange resin pretreated with an alkali. The free bases of Formula I are yielded, which may be reacted with inorganic or organic acids to produce acid addition salts. Examples of acids for acid addition salt formation are hydrochloric, hydrobromic, hydriodic, nitric, sulphuric, phosphoric, methanesulphonic, p-toluenesulphonic, naphthaline-1,5-disulphonic, cyclohexylsulphamic, maleic, benzoic, hexahydrobenzoic, fumaric, malic, tartaric and citric acid. However, it is also possible to exchange the anion in the resulting salts by a substitution reaction. Thus, for example, by treating the sulphates with an aqueous barium chloride solution, the corresponding hydrochlorides are obtained, and the difficultly soluble barium sulphate results as by-product. Reaction of the hydrochlorides with an aqueous silver sulphate solution yields the corresponding sulphates and the difficulty soluble silver chloride in analogous manner.

The amines of Formula II used as starting materials are new, with the exception of 2,3-dihydro-1H-benz[d,e]isoquinoline. The hitherto unknown compounds of Formula II, which also form part of the present invention, are produced by reducing a naphthalimide of Formula V,

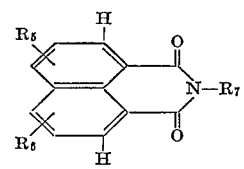

V in which either $R_5$ signifies hydrogen and
$R_6$ signifies halogen, benzyloxy, lower alkoxy or benzoylamino, or $R_5$ and $R_6$ have the same significance and each signifies halogen, benzyloxy, lower alkoxy or benzoylamino, and
$R_7$ signifies hydrogen or benzyl, with lithium aluminium hydride in an organic medium which is inert under the reaction conditions, preferably in a mixture of ether and benzene, whereby any benzoylamino radicals which may be present are converted into benzylamino radicals; any benzyl radicals which may be present are subsequently removed by hydrogenolysis, e.g. in the presence of a palladium catalyst, and/or any lower alkoxy radicals which may be present are optionally split by acid reaction, e.g. by heating with an aqueous hydrogen bromide solution.

The naphthalimides of Formula V, insofar as they are unknown may, for example, be produced as follows: A naphthalic acid anhydride of Formula VI,

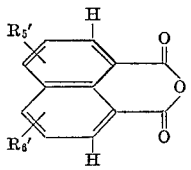

VI in which either

R₅' signifies hydrogen and

R₆' signifies halogen, hydroxy, lower alkoxy or amino, or

R₅' and R₆' have the same significance and each signifies halogen, hydroxy, lower alkoxy or amino, is heated to 100–200° C. with ammonia or benzylamine, a pressure vessel being used in the first case. Any hydroxy radicals which may be present are subsequently converted into benzyloxy radicals e.g. by reacting with benzyl bromide in the presence of an acid-binding agent, e.g. potassium carbonate, and any amino radicals which may be present are acylated in the presence of an acid-binding agent, e.g. triethylamine, with benzoyl chloride. The naphthalic acid anhydrides of Formula VI may be obtained by heating the corresponding naphthalic acids.

The compounds of Formula IV have hitherto not been described. Their production, which also forms part of the present invention, is effected by reacting an amine of Formula IIa,

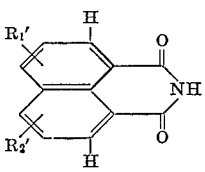

IIa in which R₁' and R₂' have the above significance, e.g. in dimethyl formamide or acetonitrile, with an isothio-cyanate of Formula VII,

R₃'—N=C=S    VII in which R₃' has the above significance, at room temperature or at an elevated temperature, e.g. 50° C. The resulting thio-urea derivatives are subsequently alkylated by reacting with lower alkyl chlorides, bromides or iodides, e.g. methyl iodide, or with lower dialkyl sulphates, whereby the corresponding salts of compounds IV are obtained.

1-pyrazol-carboxamidines, which may have a lower alkyl radical on the carboxamidine group, and which may optionally be mono- or di-substituted in the 3- and/or 5-position by lower alkyl or aryl, may, for example, be obtained by reacting the corresponding aminoguanidines with suitable 1,3-dicarbonyl compounds or their acetals, e.g. acetyl-acetone or 1,1,3,3-tetra-ethoxy-propane.

The compounds of Formula I are useful because they possess pharmacological utility in animals. In particular, the compounds are useful in the treatment of hypertonia and heart and other circulatory illnesses as is indicated by tests carried out in rats and dogs. They lower the artificially raised blood pressure of rats [Method of Grollman, Proc. Soc. exp. Biol. & Med. 57, 102 (1944)], and hypertonic dogs [Method of Goldblatt, J. exp. Med. 59, 227 (1937)]. In tests carried out with normotonic dogs, however, the compounds only exert a blood pressure lowering action when administered in much higher doses than is required to exert a blood pressure lowering action on hypertonic dogs. The compounds are well resorted from the stomach intestine tract as is shown by the comparison between effective doses administered sc. and po. respectively to the hypertonic rat. Toxic effects are only observed at doses many times higher than required for the desired antihypertonic action.

For the above-mentioned use, the dosage administered will, of course, vary depending upon the compound employed, mode of administration and treatment desired. However, in general satisfactory results are obtained when administered at a daily dosage of from about 0.5 mg. to about 10 mg./kg. of animal body weight, preferably given in divided doses 1 to 4 times a day or in sustained release form. For the larger mammals, the total daily dosage is in the range of from about 35 mg. to about 700 mg. and dosage forms suitable for oral administration comprise from about 20 mg. to about 200 mg. of the compound admixed with a solid or liquid pharmaceutical carrier or diluent.

The compounds of the invention or their hydrosoluble, physiologically tolerated acid addition salts may be used as pharmaceuticals on their own or in the form of suitable medicinal preparations, e.g. tablets, dragées, injectable solutions or suppositories, for administration, e.g. enterally or parenterally. Aside from the usual inorganic or organic, physiologically inert adjuvants, e.g. lactose, starch, talcum, stearic acid, water, alcohols, glycerin, natural or hardened oils and waxes, these preparations may also contain suitable preserving, stabilizing or wetting agents, solubilizers, sweetening or colouring substances and flavourings.

The term "in manner known per se" as used herein designates methods in use or described in the literature on the subject.

In the following non-limitative examples all temperatures are indicated in degrees centigrade. The melting points are uncorrected.

EXAMPLE 1

2,3-dihydro-1H-benz[d,e]isoquinoline-2-carboxamidine 5.9 g. of 2,3-dihydro-1H-benz[d,e]isoquinoline and 5.1 g. of 1-pyrazol-carboxamidine hydrochloride are heated to the boil for three hours in 100 cc. of chloroform. While the 1-pyrazol-carboxamidine hydrochloride dissolves, the hydrochloride of the compound indicated in the heading already commences to crystallize; after cooling the reaction mixture, the hydrochloride is filtered off and recrystallized from water; M.P. 333–335°.

EXAMPLE 2

2,3-dihydro - 1H - benz[d,e]isoquinoline-2-carboxamidine 24.4 cc. of n-NaOH and subsequently 4.1 g. of S-methyl-iso-thio-urea sulphate are added to a solution of 5.0 g. of 2,3-dihydro-1H-benz[d,e]isoquinoline hydrochloride in 70 cc. of methanol/water (5:2). The mixture is heated to the boil at reflux for 3 hours and is subsequently evaporated to dryness. The residue is dissolved in a small amount of water while heating; bis-(2,3-dihydro-1H-benz[d,e]isoquinoline-2-carboxamidine) sulphate crystallizes upon cooling. M.P. 310–315°.

EXAMPLE 3

2,3-dihydro - 1H - benz[d,e]isoquinoline-2-carboxamidine

A mixture of 1 g. of 2,3-dihydro-1H-benz[d,e]isoquinoline hydrochloride and 0.245 g. of cyanamide is heated to 170° (bath temperature) for 15 minutes, whereby the material melts. Cooling is effected, and the solidified melted material is crystallized from water, whereby the hydrochloride of the compound indicated in the heading, having a M.P. of 333–334°, is obtained.

EXAMPLE 4

2,3-dihydro-5-methoxy-1H-benz[d,e]uisoquinoline-2-carboxamidine

A sodium butylate solution (produced from 0.9 g. of sodium and 100 c. of butanol) is added to 9.2 g. of 2,3-dihydro-5-methoxy-1H-benz[d,e]isoquinoline hydrochloride. The resulting solution of the free base is mixed with a solution of 5.7 g. of 1-pyrazol-carboxamidine hydrochloride in 50 cc. of methanol, and heating to the boil at reflux is effected for 1½ hours. Ether is added to the cooled reaction mixture until crystallization commences, filtration is effected, and the filter residue is recrystallized from ethanol/ether; 2,3-dihydro - 5 - methoxy-1H-benz-[d,e]isoquinoline-2-carboxamidine hydrochloride has a M.P. of 285–287°.

The starting material may be produced in accordance with one of the two methods described below:

(I) From 3-methoxy-naphthalic acid anhydride (a) N-benzyl-3-methoxy-naphthalimide.—95 g. of 3-methoxy-naphthalic acid anhydride and 450 cc. of benzylamine are heated to 160° (bath temperature) while stirring for 2 hours, 4 liters of water are subsequently aded to the hot, brown reaction mixture, the mixture is allowed to cool, and the precipitated crystals are filtered off. The filter residue is washed with water until neutral and is taken up in chloroform; the resulting solution is dried over sodium sulphate and concentrated by evaporation, whereby N-benzyl-3-methoxy-naphthalimide results in the form of yellow crystals having a M.P. of 162–169°.

(b) 2 - benzyl-2,3-dihydro-5-methoxy-1H-benz[d,e]isoquinoline hydrochloride.—32.3 g. of lithium aluminum hydride are added to 1.5 liters of amixture of ether and benzene (2:1) and subsequently 90 g. of N-benzyl-3-methoxy-naphthalimide are added portionwise, and the resulting green suspension is heated to the boil for 22 hours. A total of 50 cc. of water is subsequently added dropwise to the reaction mixture, filtration is effected, and the filter residue is washed several times with ether; an excess of a solution of hydrogen chloride in ether is added to the filtrate, and the precipitated crystals are filtered off. After crystallization from ethanol the compound indicated in the heading has a M.P. of 203–207°.

(c) 2,3 - dihydro-5-methoxy-1H-benz[d,e]isoquinoline hydrochloride.—19.1 g. of 2-benzyl-2,3-dihydro-5-methoxy-1H-benz[d,e]isoquinoline hydrochloride are taken up in 250 cc. of absolute methanol, and hydrogenation is effected in the presence of 3.0 g. of a palladium catalyst (10% on active charcoal) at 40° and a pressure of 6 atmospheres for 19 hours. After the taking up of hydrogen has been completed (97.8% of the calculated amount), the catalyst is filtered off, the filtrate is concentrated by evaporation and the residue is crystallized from methanol; the compound indicated in the heading has a M.P. of 300° (decomposition).

(II) From 3-methoxy-naphthalimide 10.3 g. of lithium aluminium hydride are added to 400 cc. of a mixture of ether and benzene (5:3) and subsequently 28.7 g. of 3-methoxy-naphthalimide are added portionwise, and the resulting green suspension is heated to the boil for 17 hours. A total of 25 cc. of water is subsequently added dropwise to the reaction mixture, filtration is effected, and the filter residue is washed several times with ether; an excess of a solution of hydrogen chloride in ether is added to the filtrate, and the precipitated crystals are filtered off. After crystallization from ethanol the resulting 2,3-dihydro-5-methoxy-1H-benz[d,e]isoquinoline hydrochloride has a M.P. of 300° (decomposition).

EXAMPLE 5

2,3-dihydro-5-hydroxy-1H-benz[d,e]isoquinoline-2-carboxamidine 18.5 g. of 2,3-dihydro-5-hydroxy-1H-benz[d,e]isoquinoline hydrobromide are triturated with 4.21 g. of cyanamide and heated to 180° (oil bath temperature), whereby a brown melted material results, which solidifies after about 5 minutes. Heating is effected to 200° for 15 minutes, the mixture is allowed to cool, and the dark brown mixture is taken up in methanol. The solution is treated with active charcoal and is filtered; the filtrate is concentrated in a vacuum until crystallization commences. The precipitated hydrobromide of the compound indicated in the heading is filtered off; M.P. 289–290°.

The starting material may, for example, be produced as follows:

15 g. of 2,3-dihydro-5-methoxy-1H-benz[d,e]isoquinoline hydrochloride (production see Example 3) are heated to the boil in 160 cc. of 48% aqueous hydrogen bromide solution for 5 hours, whereby a crystalline precipitate starts to separate after 3 hours. The mixture is allowed to cool, is filtered, and the filter residue is crystallized from methanol/ether; 2,3-dihydro-5-hydroxy-1H-benz[d,e]isoquinoline hydrobromide has a M.P. of 269–270°.

EXAMPLE 6

2,3-dihydro-5-hydroxy-1H-benz[d,e]isoquinoline-2-carboxamidine

The hydrochloride of the compound indicated in the heading, having a M.P. of 288–289°, is obtained from 2,3-dihydro-5-hydroxy-1H-benz[d,e]isoquinoline hydrochloride and cyanamide in a manner analogous to that described in Example 5.

The starting material may, for example, be produced as follows:

(a) N-benzyl-3-hydroxy-naphthalimide.—91 g. of 3-hydroxy-naphthalic acid anhydride and 450 cc. of benzylamine are heated to 160° (bath temperature) for 2 hours, the hot mixture is poured into 6 liters of water, the mixture is allowed to cool and filtered. The filter residue is first washed with 10 liters of water and then with 4 liters of chloroform; N-benzyl-3-hydroxy-naphthalimide remains on the filter as a yellow residue having a M.P. of 228–230°.

(b) N-benzyl-3-benzyloxy-naphthalimide.—122.1 g. of N-benzyl-3-hydroxy-naphthalimide are suspended in 3 liters of ethanol, 77.5 g. of benzyl bromide and 83.5 g. of potassium carbonate are added, and the mixture is heated at reflux for 4½ hours. The mixture is then allowed to cool and is filtered; the filter residue is thoroughly washed with ethanol and taken up in 2 liters of chloroform. Petroleum ether is added to the resulting solution until crystallization commences, and the compound indicated in the heading is filtered off; yellow crystals having a M.P. of 174–175°.

(c) 2 - benzyl - 5 - benzyloxy - 2,3 - dihydro - 1H-benz[d,e]isoquinoline hydrochloride.—42.5 g. of lithium aluminium hydride are suspended in one liter of benzene, 500 cc. of ether are added and 148.2 g. of N-benzyl-3-benzyloxy-naphthalimide are then added portionwise. The mixture is heated to the boil for 17 hours, a total of 50 cc. of water is then added dropwise, filtration is effected, and 250 cc. of a 2.2 N solution of hydrogen chloride in ether is added. The precipitated crystals are filtered off and recrystallized from methanol/ether; the compound indicated in the heading has a M.P. of 245–247°.

(d) 2,3 - dihydro-5-hydroxy-1H-benz[d,e]isoquinoline hydrochloride.—2 g. of 2-benzyl - 5 - benzyloxy-2,3-dihydro-1H-benz[d,e]isoquinoline hydrochloride are dissolved in 200 cc. of methanol, and hydrogenation is effected in the presence of 0.5 g. of a palladium catalyst (10% of charcoal) at room temperature and normal pressure. After the taking up of hydrogen has been completed, the catalyst is filtered off, and the filtrate is concentrated by evaporation until crystallization commences, whereby the compound indicated in the heading, having a M.P. of 264–266°, is obtained.

EXAMPLE 7

5-amino-2,3-dihydro-1H-benz[d,e]isoquinoline-2-carboxamidine 0.47 g. of 5-amino-2,3-dihydro-1H-benz[d,e]isoquinoline hydrochloride are triturated with 0.107 g. of cyanamide, and heating is effected to 170° (bath temperature) for 15 minutes, whereby the material melts. The mixture is heated to 240° for a further five minutes, is allowed to cool, and the solidified melted material is crystallized from methanol/ethanol, whereby the hydrochloride of the compound indicated in the heading, having a M.P. of 270–272°, is obtained.

The starting material may, for example, be produced as follows:

(a) 3-amino - N - benzyl-naphthalimide.—70 g. of 3-amino-naphthalic acid anhydride are heated to 100° (bath temperature) with 310 g. of benzylamine for 3 hours, the hot mixture is poured into 3 liters of water, and the resulting precipitate is filtered off. The filter residue is washed thoroughly with water and is taken up in chloroform. The resulting solution is dried over sodium sulphate and concentrated by evaporation in a vacuum, whereby the compound indicated in the heading is obtained as residue; M.P. 205–206° (after drying in a vacuum at 60° for 15 hours).

(b) 3-benzoylamino-N-benzyl-naphthalimide.—73.6 g. of 3-amino-N-benzyl-naphthalimide, 24.6 g. of triethyl amine and 34.2 g. of benzyl chloride are heated to the boil in 3 liters of chloroform for 2 hours. The mixture is evaporated to dryness, and the residue is extracted first with water and then with chloroform, and the extracts are discarded. The compound indicated in the heading is obtained as extraction residue; M.P. 237.5–239.5° (after drying in a vacuum at 80° for 15 hours).

(c) 2 - benzyl - 5 - benzylamino-2,3-dihydro-1H-benz[d,e]isoquinoline.—350 cc. of ether are added to a suspenson of 19 g. of lithium aluminium hydride in 500 cc. of benzene, and 66.5 g. of 3-benzoylamino-N-benzyl-naphthalimide are subsequently added portionwise. The mixture is heated to the boil for 2 hours, a total of 35 cc. of water is then added, filtration is effected, and 250 cc. of a 2.2 N solution of hydrogen chloride in ether are added to the filtrate. The precipitated oil which gradually solidifies is separated and taken up in methanol, whereby it only dissolves partially. Filtration is effected, the filtrate is concentrated by evaporation until crystallization commences, and the resulting precipitate is filtered off; the hydrochloride of the compound indicated in the heading has a M.P. of 280–282°.

(d) 2 - amino - 2,3-dihydro-1H-benz[d,e]isoquinoline hydrochloride.—2.8 g. of 2-benzyl-5-benzylamino-2,3-dihydro-1H-benz[d,e]-isoquinoline hydrochloride are hydrogenated in 250 cc. of methanol in the presence of 0.5 g. of a palladium catalyst (10% on charcoal) at 50° and 6 atmospheres. After cooling the catalyst is filtered off, the filtrate is concentrated by evaporation until crystallization commences, and the precipitate is filtered off; the compound indicated in the heading has a M.P. of 311°.

EXAMPLE 8

6-bromo-2,3-dihydro-1H-benz[d,e]isoquinoline-2-carboxamidine 0.5 g. of 6-bromo-2,3-dihydro-1H-benz[d,e]isoquinoline hydrochloride are triturated with 0.11 g. of cyanamide, and heating is effected to 220° (bath temperature) for 15 minutes, whereby the material melts. The mixture is subsequently allowed to cool, the solidified melted material is taken up in ethanol/water, the solution is treated with active charcoal, is filtered, and the filtrate is evaporated to dryness. The residue is taken up in methanol, ether is added to the solution until crystallization commences, and the resulting precipitate is filtered off; the resulting hydrochloride of the compound indicated in the heading has a M.P. of 318–319°.

The starting material may be produced as follows:

9 g. of lithium aluminum hydride are added to 850 cc. of a mixture of ether/benzene (7:10), and 41.8 g. of 4-bromo-naphthalimide are subsequently added portionwise, and the resulting brown suspension is heated to the boil for 16 hours. A total of 20 cc. of water is subsequently added dropwise to the reaction mixture, the precipitate is filtered off, and the filter residue is washed several times with ether. An excess of a solution of hydrogen chloride in ether is added to the filtrate, and the precipitated 6-bromo - 2,3-dihydro-1H-benz[d,e]isoquinoline hydrochloride is filtered off; M.P. 281–283°.

EXAMPLE 9

2,3-dihydro-5,8-dimethoxy-1H-benz[d,e]isoquinoline-2-carboxamidine

A sodium butylate solution (produced from 0.173 g. of sodium and 50 cc. of butanol) is added to 2 g. of 2,3-dihydro - 5,8-dimethoxy-1H-benz[d,e]isoquinoline hydrochloride. The precipitated sodium chloride is filtered off, 1.1 g. of 1-pyrazol-carboxamidine hydrochloride are added to the filtrate, and the mixture is heated to the boil for 4 hours. The butanol is subsequently evaporated in a vacuum, and the residue is crystallized from ethanol containing 4% of water, whereby the hydrochloride of the compound indicated in the heading, having a M.P. of 117–119° (containing 1 mol of water of crystallization), is obtained.

The starting material may be produced as follows:

(a) N-benzyl-3,6-dimethoxy-naphthalimide.—82 g. of 3,6-dimethoxy-naphthalic acid anhydride and 350 cc. of benzylamine are heated to 160° (bath temperature) for 2 hours, and 4 liters of water are added to the hot solution. The precipitated crystal mash is filtered off, washed well with water and taken up in chloroform. The solution is dried over sodium sulphate and evaporated to dryness in a vacuum, whereby the compound indicated in the heading is obtained as residue; yellow crystals having a M.P. of 217–220°.

(b) 2 - benzyl-2,3-dihydro-5,8-dimethoxy-1H-benz[d,e] isoquinoline.—4 g. of lithium aluminium hydride are added to 250 cc. of a mixture of ether/benzene (3:2), and subsequently 9.1 g. of N-benzyl-3,6-dimethoxy-naphthalimide are added portionwise, and the resulting yellow suspension is heated to the boil for 4 hours. A total of 10 cc. of water is subsequently added dropwise to the reaction mixture, filtration is effected, and the filter residue is washed several times with ether; an excess of a solution of hydrogen chloride in ether is added to the combined filtrates, and the precipitated hydrochloride of the compound indicated in the heading is filtered off; yellow crystals having a M.P. of 251–253° (after crystallization from methanol/ethanol).

(c) 2,3 - dihydro - 5,7 - dimethoxy - 1H - benz[d,e,] isoquinoline.—5.79 g. of 2-benzyl-2,3-dihydro-5,7-dimethoxy-1H-benz[d,e]isoquinoline hydrochloride are dissolved in 700 cc. of methanol, and hydrogenation is effected in the presence of 2 g. of a palladium catalyst (10% on charcoal) at room temperature and normal pressure while shaking. After the taking up of hydrogen has been completed, the catalyst is filtered off, the filtrate is concentrated until crystallization commences, and the precipitated hydrochloride of the compound indicated in the heading is filtered off; colourless crystals having a M.P. of 298°.

EXAMPLE 10

2,3-dihydro-N-methyl-1H-benz[d,e]isoquinoline-2-carboxamidine 10 g. of 2,3-dihydro-2-(N-methyl)thiocarbamoyl-1H-benz[d,e]-isoquinoline and 80 cc. of methyl iodide are heated to 100° (4 atmospheres) in an autoclave for 15 hours. After cooling, the excess methyl iodide is evaporated, 80 cc. of liquid ammonia are added to the 2,3-dihydro - 2 - (α - methylimino-α-methylthio)methyl-1H-benz[d,e]-isoquinoline hydriodide obtained as residue, and the mixture is heated to 100° (28 atmospheres) in an autoclave for 4 hours. After cooling, the excess ammonia and the resulting methylmercaptan are evaporated, and the resulting residue is crystallized from ethanol/ether; the hydriodide of the compound indicated in the heading has a M.P. of 218–220°.

The starting material may, for example, be produced as follows:

A suspension of 50 g. of 2,3-dihydro-1H-benz[d,e]isoquinoline hydrochloride and 51.5 g. of sodium carbonate in 250 cc. of dimethylformamide is heated to 50° in an atmosphere of nitrogen for 30 minutes, 17.8 g. of methylisothiocyanate, dissolved in 50 cc. of dimethylformamide, are subsequently added, and the mixture is heated to 60° (bath temperature) for 5 hours. 1 liter of water is subsequently added, whereby 2,3-dihydro-2-(n-methyl)thiocarbamoyl - 1H-benz[d,e]isoquinoline precipitates; M.P. 209–211° after crystallization from methanol.

EXAMPLE 11

Galenical preparation: tablets

| | G.¹ |
|---|---|
| 2,3 - dihydro-1H-benz[d,e]isoquinoline-2-carboxamidine hydrochloride (Example 1) | 0.1175 |
| Dimethylsilicone oil | 0.0005 |
| Magnesium stearate | 0.0010 |
| Polyethylene glycol 6000 | 0.0015 |
| Polyvinyl pyrrolidone | 0.0040 |
| Talcum | 0.0050 |
| Maize starch | 0.10 |
| Lactose | 0.0405 |
| For a tablet of | 0.180 |

¹ Corresponds to 0.10 g. of the free base.

What is claimed is:
1. A compound of the formula:

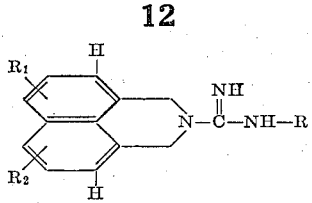

wherein either $R_1$ is hydrogen and $R_2$ is halogen, hydroxy, lower alkoxy of 1 to 4 carbon atoms, or amino, or $R_1$ and $R_2$ are the same and each is hydrogen, halogen, hydroxy, lower alkoxy of 1 to 4 carbon atoms, or amino, and $R_3$ is hydrogen, or lower alkyl of 1 to 4 carbon atoms, and a pharmaceutically acceptable acid addition salt thereof.

2. A compound according to claim 1, in which the compound is 2,3-dihydro-1H-benz[d,e]isoquinoline-2-carboxamidine.

3. A compound according to claim 1, in which the compound is 2,3 - dihydro - 5-methoxy-1H-benz[d,e]isoquinoline-2-carboxamidine.

4. A compound according to claim 1, in which the compound is 2,3 - dihydro - 5-hydroxy-1H-benz[d,e]isoquinoline-2-carboxamidine.

5. A compound according to claim 1, in which the compound is 5-amino-2,3-dihydro-1H-benz[d,e]isoquinoline-2-carboxamidine.

6. A compound according to claim 1, in which the compound is 6-bromo-2,3-dihydro-1H-benz[d,e]isoquinoline-2-carboxamidine.

7. A compound according to claim 1, in which the compound is 2,3-dihydro-5,8-dimethoxy-1H-benz[d,e]isoquinoline-2-carboxamidine.

8. A compound according to claim 1, in which the compound is 2,3-dihydro-N-methyl-1H-benz[d,e]isoquinoline-2-carboxamidine.

References Cited

UNITED STATES PATENTS

| 3,157,573 | 11/1964 | Wenner | 424—258 |
| 3,291,829 | 12/1966 | Moll | 260—288X |
| 3,314,963 | 4/1967 | Koch | 260—288 |

FOREIGN PATENTS

| 1,549,630 | 11/1968 | France | 260—288 |

DONALD G. DAUS, Primary Examiner

U.S. Cl. X.R.

260—281, 283, 289, 310, 454, 546; 424—258